(12) United States Patent
Hofmann et al.

(10) Patent No.: US 7,480,553 B2
(45) Date of Patent: Jan. 20, 2009

(54) DRIVING DYNAMIC CONTROL OR REGULATING SYSTEM AND METHOD FOR A TWO-TRACK, TWO-AXLE MOTOR VEHICLE

(75) Inventors: Martin Hofmann, Munich (DE); Klaus Webers, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/882,271

(22) Filed: Jul. 31, 2007

(65) Prior Publication Data

US 2007/0271018 A1    Nov. 22, 2007

Related U.S. Application Data

(63) Continuation of application No. PCT/EP2006/000704, filed on Jan. 27, 2006.

(30) Foreign Application Priority Data

Feb. 1, 2005    (DE) .................. 10 2005 004 601

(51) Int. Cl.
*B62D 6/08*    (2006.01)
(52) U.S. Cl. .................. 701/69; 180/245; 180/247
(58) Field of Classification Search .................. 701/69; 180/245, 246, 247, 248; *B62D 6/08*
See application file for complete search history.

(56) References Cited

U.S. PATENT DOCUMENTS 4,966,250 A * 10/1990 Imaseki .................. 180/233

(Continued)

FOREIGN PATENT DOCUMENTS

DE    697 13 694 T2    10/2002

(Continued)

OTHER PUBLICATIONS

International Search Report dated Mar. 31, 2006 including English translation (Four (4) pages).

*Primary Examiner*—Tuan C To
(74) *Attorney, Agent, or Firm*—Crowell & Moring LLP

(57) ABSTRACT

A system and method are provided for controlling or automatically controlling the driving dynamics of a two-track, two-axle motor vehicle having only one driven axle, which, for the rolling moment support, has a system for changing the distribution of the wheel contact forces to the left and right wheel respectively of each axle. The fractions of the rolling moment support taken over by the front axle and by the rear axle are changeable as a function of the drive torque provided by the drive assembly of the motor vehicle. For this purpose, a desired wheel contact force for the driven wheels can be determined from the drive torque, and by way of this desired wheel contact force, the distribution of the rolling torque support can be determined. A change of the distribution of the rolling moment support as a function of the drive torque of the drive assembly is preferably carried out only if the otherwise available contact force would otherwise not be sufficient for the transmission of the drive torque to the road. A slip control may be superimposed on this pilot control, which slip control seeks to minimize the deviation between the determined rotational speed difference of the driven wheels and the rotational speed difference corresponding to the respective driving condition.

11 Claims, 1 Drawing Sheet

U.S. PATENT DOCUMENTS

| | | | | |
|---|---|---|---|---|
| 4,981,190 | A * | 1/1991 | Nakayama et al. | 180/197 |
| 5,004,064 | A * | 4/1991 | Tezuka et al. | 180/197 |
| 5,168,953 | A * | 12/1992 | Naito | 180/197 |
| 5,186,487 | A | 2/1993 | Wood et al. | |
| 5,225,984 | A * | 7/1993 | Nakayama | 701/36 |
| 5,701,247 | A * | 12/1997 | Sasaki | 701/1 |
| 5,790,970 | A * | 8/1998 | Brachert et al. | 701/70 |
| 5,947,221 | A * | 9/1999 | Taniguchi et al. | 180/197 |
| 5,987,369 | A * | 11/1999 | Kwak et al. | 701/37 |
| 6,471,218 | B1 | 10/2002 | Burdock et al. | |
| 7,396,308 | B2 * | 7/2008 | Tabata et al. | 475/159 |
| 2001/0041958 | A1 * | 11/2001 | Oshiro et al. | 701/69 |
| 2002/0041167 | A1 * | 4/2002 | Kitano et al. | 318/3 |
| 2002/0109309 | A1 * | 8/2002 | Schulke et al. | 280/5.505 |
| 2004/0176890 | A1 | 9/2004 | Acker et al. | |

FOREIGN PATENT DOCUMENTS

| | | |
|---|---|---|
| EP | 0 827 852 B1 | 3/1998 |

* cited by examiner

DRIVING DYNAMIC CONTROL OR REGULATING SYSTEM AND METHOD FOR A TWO-TRACK, TWO-AXLE MOTOR VEHICLE

CROSS-REFERENCE TO RELATED APPLICATIONS

This application is a continuation of PCT International Application No. PCT/EP2006/000704, filed Jan. 27, 2006, which claims priority under 35 U.S.C. §119 to German Application No. 10 2005 004 601.0, filed Feb. 1, 2005, the entire disclosures of which are expressly incorporated by reference herein.

BACKGROUND AND SUMMARY OF THE INVENTION

The invention relates to a driving dynamics control or regulating system and method for a two-track, two-axle motor vehicle having only one driven axle. For the rolling moment support, a system is provided for changing the distribution of the wheel contact forces to the left and right wheel, respectively, of each axle, the fractions of the rolling moment support taken over by the front axle and by the rear axle being changeable as a function of a marginal condition. With respect to the known state of the art, reference is made, for example, to German Patent document DE 697 13 694 T2.

From DE 697 13 694 T2, it is known that, by generating a so-called rolling counter-moment in the chassis of a motor vehicle, the latter can be stabilized when cornering. While taking into account the actual vehicle speed, the angle of steering lock, and the difference between a desired value for the yaw rate derived therefrom and the actual yaw rate value, the fraction of the rolling counter-moment applied to the stabilizer bar of the rear vehicle axle is increased with respect to that at the front axle if the actual yaw value is smaller than the desired yaw value, whereupon a less understeering vehicle handling occurs. In contrast, if the actual yaw rate value is greater than the desired yaw rate value, a vehicle handling occurs which has the tendency to oversteer, and which is counteracted in that the fraction of the rolling counter-moment applied to the stabilizer bar of the rear vehicle axle is reduced and the rolling counter-moment fraction at the front vehicle axle is correspondingly increased. This known system is thus equipped with a yaw rate controller.

However, the present invention relates to a system for controlling or automatically controlling the driving dynamics of a two-track, two-axle motor vehicle having only one driven axle, which, for the rolling moment support, has a system for changing the distribution of the wheel contact forces to the left and right wheel respectively of each axle, the fractions of the rolling moment support taken over by the front axle and by the rear axle being changeable as a function of a marginal condition. That is, a system according to the present invention does not have to contain a yaw rate controller. On the contrary, a different distribution of the rolling moment support between the front axle and the rear axle of the vehicle can also take place as a function of other marginal conditions, thus, for example, as a function of the driving speed of the vehicle and as a function of the marginal condition explained in the following, which is the content of the present invention, or also of the latter alone. The present invention is based on the following problems.

By way of the open differentials usually installed today, the propulsion power is distributed by 50% respectively to the two wheels of the driven vehicle axle. In the following, a driven rear axle is used as the basis without, however, limiting the present invention thereto. When the lateral acceleration of the vehicle is too high, the contact force at the rear wheel, which is on the inside during the cornering, may now no longer be sufficient for converting the drive torque provided by the vehicle drive assembly to longitudinal force. As a result, the wheel may, as it were, "break away"; that is, the wheel traction becomes poorer and there is the threat of power oversteering. In the, so far, conventional state of the art, such a "breaking-away of the wheel is avoided by a targeted braking intervention which, however, is disadvantageous because driving energy is hereby virtually unnecessarily destroyed and the wear of the vehicle braking system is increased. Finally, such braking interventions are noticeable to the driver and are, therefore, performed at the expense of comfort.

It is an object of the present invention to provide a solution for the described problems.

The solution of this task with respect to a system for controlling or automatically controlling the driving dynamics is characterized in that the drive torque provided by the drive assembly of the motor vehicle (or a quantity firmly connected therewith) represents a marginal condition by which the fractions of the rolling moment support are changed as a function of the marginal condition. Advantageous developments and further developments are described herein.

Other objects, advantages and novel features of the present invention will become apparent from the following detailed description of the invention when considered in conjunction with the accompanying drawings.

DETAILED DESCRIPTION OF THE DRAWINGS

Figure 1:
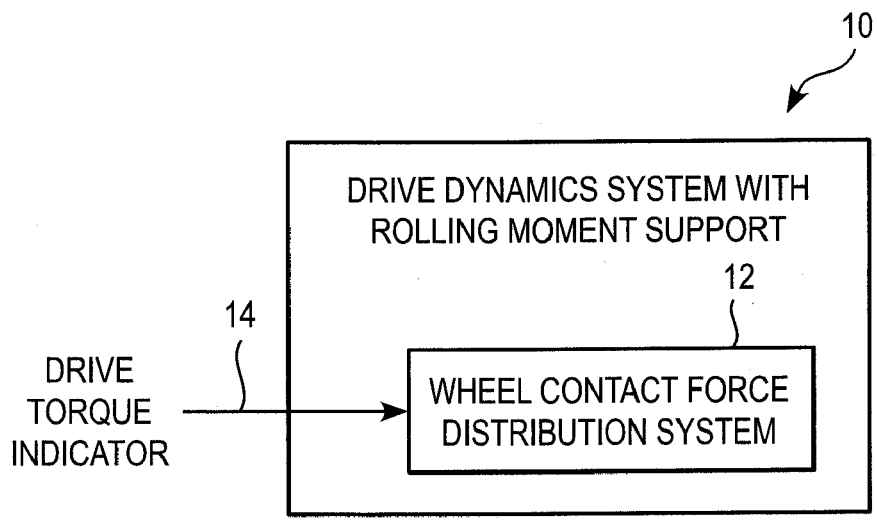
FIG. 1 is a simplified schematic diagram of the system according to the present invention.
Figure 2:
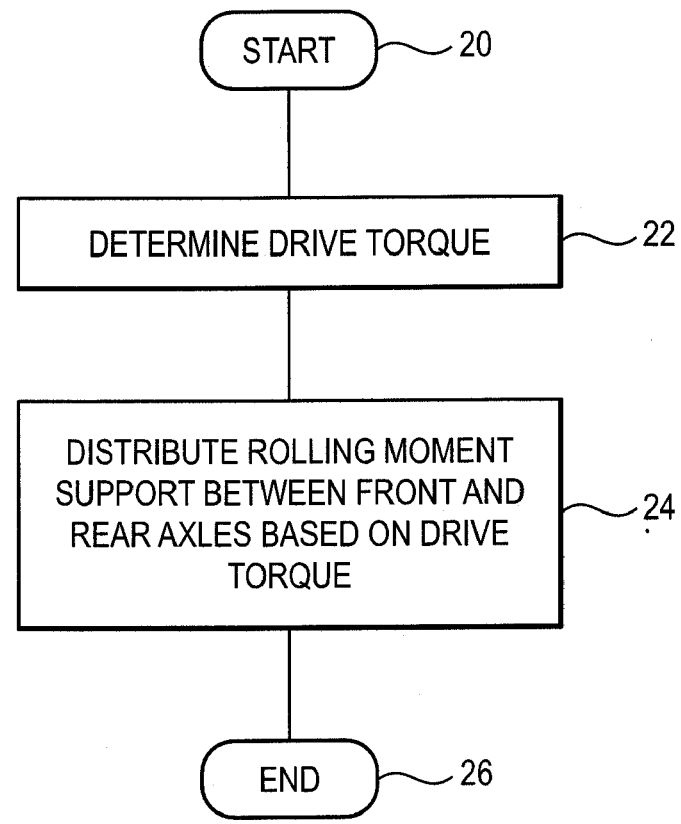
FIG. 2 is a simplified flow chart illustrating the method according to the present invention.

Referring to the figures, a simplified block diagram of the drive dynamic system 10 is illustrated with the rolling moment support. A wheel contact force distribution system 12 distributes the rolling moment support between the front and rear axles of the vehicle as a function of a drive torque indicator value 14. Accordingly, with reference to FIG. 2, after starting 20 the method, a drive torque indicator value is determined 22. As a function of the drive torque indicator value, the rolling moment support is distributed between the front axle and the rear axle of the vehicle.

The moment distribution of a rolling moment support, which is preferably implemented by way of divided stabilizer bars, whose halves can be rotated at least slightly against each other, is carried out by way of an actuator as a function of the actual drive torque, which is to be transmitted to the road by way of the driven wheels. This appropriate distribution of the rolling moment support between the front axle and the rear axle of the vehicle, that is, for example, between the front-axle stabilizer and the rear-axle stabilizer, can preferably take place in the form of a pilot control (and thus at first without an automatic control operation). For this purpose, the torsional strength of the two stabilizer bars in this embodiment is adjusted in the desirable manner by their respective actuator. It is explicitly pointed out here that, instead of the drive torque to be transmitted, another physical quantity can also be used, which is comparable to the drive torque to be transmitted; that is, is in a direct relationship thereto.

It is known that the distribution of the contact forces of a vehicle is essentially determined by its longitudinal acceleration and lateral acceleration, as well as by the so-called moment factor (=croll). When a certain contact force is required at a wheel, the moment factor croll-desired required for this purpose can be calculated as follows by way of an inverse static vehicle model:

croll_desired=0.5*(−2*$Fz$*||spurw+
$lv$*mass*$g$*spurw−2*mass*$ay$*$cgh$*||+
mass*$ax$*$cgh$*spurw)/mass/$ay$/$cgh$/||;

Fz=desired wheel contact force
||=wheelbase
spurw=track width
lv=distance of the vehicle center of gravity from the front axle
mass=vehicle mass
g=gravitational constant
ay=lateral acceleration
cgh=height of center of gravity
ax=longitudinal acceleration wherein "*" indicates a multiplication, "/" indicates a division, "+" indicates an addition, and "−" indicates a subtraction or a negative preceding sign. When the moment factor croll assumes the value "1", the rolling moment support takes place solely at the front axle of the vehicle, and in the case of a value croll=0, solely at the rear axle of the vehicle.

The pilot control for the above-mentioned actuators or the like, that is, for a system taking over the distribution of the rolling moment support between the front axle and the rear axle of the vehicle will then take place by way of the respective drive torque, which is to be equaled with the so-called engine torque M-Mot demanded by the driver of the vehicle. The conversion of this engine torque to the desired contact force for a driven wheel takes place as follows:

$Fz=M\_Mot*i\_transmission*i\_differential*0.5*1/(r\_wheel*mue)$;

i_transmission and i_differential being the ratio of the transmission and of the differential, respectively, and r_wheel being the wheel radius. The value mue is the maximum of the adhesion coefficient between the wheel and the road and corresponds to the coefficient of friction of the road.

By way of such pilot control, the distribution of the rolling moment support between the front axle and the rear axle of the vehicle can thereby take place in such a manner at any time depending on the drive torque demanded by the driver and, therefore, the contact force can be distributed between the vehicle wheels such that no wheel "breaks away"; that is, each wheel receives sufficient traction (naturally, still limited by the respective coefficient of friction of the road). Such an intervention preferably would take place only if the contact force at one of the two driven wheels becomes too low. In contrast, in the normal driving operation, no such intervention of the pilot control would preferably take place; that is, here, for example, the so-called moment factor can be defined by way of a characteristic curve, which is a function of the vehicle speed, as briefly addressed above. For the corresponding conversion, a so-called dead zone or a corresponding control element can be provided in the control chain.

The pilot control suggested so far is based on a known coefficient of friction or adhesion coefficient between the tire and the road. In principle, a determination of the respectively present coefficient of friction is contemplated. However, as an alternative, an estimated value can also be used for this purpose. But, when the actual coefficient of friction is less than the value on which the above-described pilot control is based, this has the result that a desired contact force is calculated which is too low. With a view to a suitable adaptation of the so-called moment factor, a slip control can be superimposed on the pilot control described above in such cases, which slip control will be described in the following.

It is true that a hereby suggested slip control, for physical reasons, cannot control the absolute slip of the driven (rear) wheels, because no intervention into the torque delivery of the drive assembly of the vehicle can take place; that is, in the event that the drive torque is too high, a tearing-away of two driven wheels cannot be avoided. However, a hereby suggested slip regulator can control the differential rotational speed of the two driving wheels (rear wheels) and therefore operates according to this principle; specifically, that the deviation between the determined rotational speed difference of the driven wheels and of the rotational speed difference corresponding to the respective driving condition is to be minimized. It is known that the so-called desired rotational speed difference, that is, the rotational speed difference of the driven wheels corresponding to the respective driving condition, is obtained in this case from the yaw rate and the track width of the vehicle, while the actual rotational speed difference can easily be measured. After a corresponding scaling, the control difference determinable therefrom can preferably be fed by way of a PI controller to an electronic control unit, which carries out the above-mentioned distribution of the rolling moment support.

The thus described "pilot control" and "slip regulator" functions have the effect that, in the case of a rear-driven vehicle, when a wheel on the inside during the cornering is slipping, the moment factor croll is increased; that is, a greater moment fraction is supported at the front axle. This not only increases the traction at the rear wheel, which is on the inside during the cornering, but also a more understeering roll steer effect is achieved, which additionally counteracts a power oversteering. Inversely, this means that a yaw rate controller, as suggested, for example, in the above mentioned document for a system for automatically controlling the driving dynamics having a changeable distribution of the rolling moment support, in principle, improves the traction in the case of the power oversteering. However, it is found that a rotational speed difference and, therefore, a slip, occurs significantly earlier than a yaw difference, and a yaw rate controller can therefore not replace a hereby additionally suggested slip regulator. In the case of a change of the distribution of the rolling moment support in opposite directions by way of a yaw rate controller, on the one hand, and by the hereby described slip control, on the other hand, this may have the result that these two systems cancel one another. In order to avoid such a mutual cancellation, the yaw rate controller may be given priority in an appropriate manner, for example, by corresponding reduction factors and/or the reversal of preceding signs in the control circuit provided here.

As far as a system for changing the distribution of the wheel contact forces is concerned, the latter may—as mentioned above—first have so-called active stabilizer bars; that is, at the front axle and at the rear axle, in each case a divided stabilizer, whose stabilizer halves can be rotated against one another via a suitable actuator.

In a particularly preferred embodiment, in addition to these stabilizer halves, dampers which are also assigned to the individual vehicle wheels and can be adjusted with respect to their characteristics, can be triggered in an appropriate manner by the system for automatically controlling the driving dynamics; that is, in the sense of a desired change of the distribution of the wheel contact forces. However, active suspension systems assigned to the individual wheels, by means of which, as known, the spring force or the characteristic spring curve can be changed, can be triggered in the appropriate manner by a system according to the invention for controlling or automatically controlling the driving dynamics.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for controlling or regulating driving dynamics of a two-track, two-axle motor vehicle having only one driven axle, the system comprising:
    a wheel contact force distribution system providing a rolling moment support, the system being operatively configured to change a distribution of wheel contact force to a left and a right wheel, respectively, of each axle;
    wherein fractions of the rolling moment support taken over by the front axle and by the rear axle are changeable as a function of a marginal condition;
    wherein a drive torque indicator quantity represents the marginal condition; and
    wherein a desired wheel contact force for the driven wheels is determined from the drive torque, by which the distribution of the rolling moment support is determined.

2. The system according to claim 1, wherein the drive torque indicator quantity is the drive torque value itself or a quantity directly related thereto.

3. The system according to claim 1, wherein, for determining the desired wheel contact force, an estimated or measured value for a coefficient of friction between the driven wheels and the road is used.

4. The system according to claim 1, wherein a change of the distribution of the rolling moment support as a function of the drive torque indicator quantity is carried out only when an available contact force at one of the left and right wheels otherwise would not be sufficient for transmitting drive torque to the road.

5. The system having a pilot control according to claim 1, further comprising a slip control superimposed on the pilot control, which slip control seeks to minimize the deviation between a determined rotational speed difference of the driven wheels and a rotational speed difference corresponding to the respective driving condition.

6. The system according to claim 5, further comprising a yaw rate controller, which also carries out a distribution of the rolling moment support, wherein, in the case of a change of the distribution of the rolling moment support in opposite directions by the yaw rate controller, on the one hand, and by a slip regulator, on the other hand, the yaw rate controller has priority.

7. The system according to claim 1, wherein in addition to active divided stabilizers, whose stabilizer halves are rotatable against one another, the system for changing the distribution of the wheel contact forces appropriately triggers dampers, which are assigned to the individual vehicle wheels and are adjustable with respect to their characteristics.

8. The system according to claim 1, which the system for changing the distribution of the wheel contact forces appropriately triggers active suspension systems assigned to the individual wheels.

9. A method for controlling driving dynamics of a two-track, two-axle motor vehicle having only a single driven axle, the method comprising the acts of:
    determining a drive torque indicative value based on a drive assembly of the motor vehicle;
    distributing a rolling moment support between a front axle and a rear axle of the two-axle motor vehicle as a function of the drive torque indicative value, which rolling limit support operates by changing a distribution of wheel contact forces to a left and right wheel, respectively, of each of the front and rear axle; and
    determining a desired wheel contact force for driven wheels of the motor vehicle from the drive torque indicative value, and utilizing the desired wheel contact force to distribute the rolling moment support.

10. The method according to claim 9, wherein for determining the desired wheel contact force, an estimated or measured value for a coefficient of friction between the driven wheels in a road is utilized.

11. The method according to claim 9, wherein the drive torque indicative value is the drive torque value provided by the drive assembly of the motor vehicle.

* * * * *